Dec. 2, 1930.  J. F. MAKOWSKI  1,783,178
CONDUIT CONSTRUCTION
Filed April 15. 1929
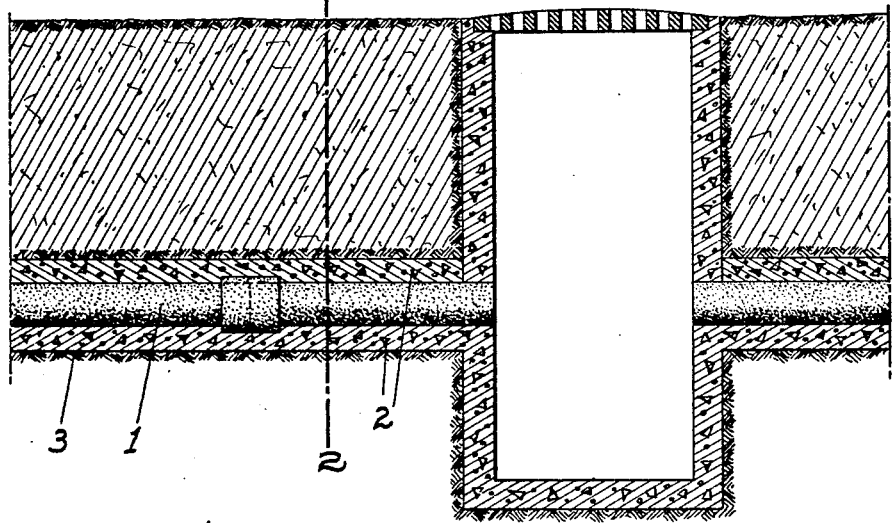
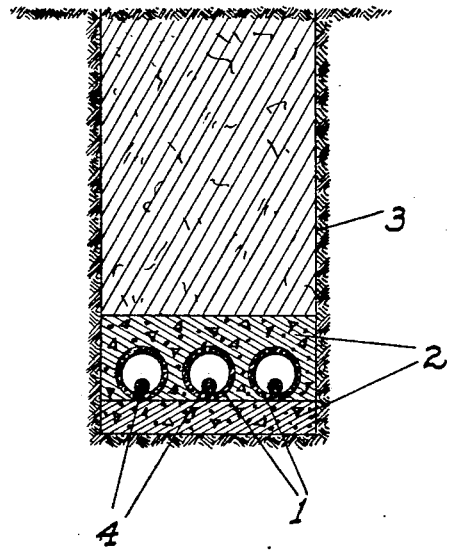
INVENTOR
J. F. Makowski
BY
ATTORNEY Patented Dec. 2, 1930

1,783,178

UNITED STATES PATENT OFFICE

JOHN F. MAKOWSKI, OF OAKLAND, CALIFORNIA, ASSIGNOR TO FIREPROOF WALL COMPANY, OF RENO, NEVADA, A CORPORATION OF NEVADA

CONDUIT CONSTRUCTION

Application filed April 15, 1929. Serial No. 355,141.

This invention relates to improvements in conduit construction and is particularly related to that type of construction in which one or a plurality of conduits are laid under ground for the reception of insulated cables for the transmission of electric current.

The present practice in this regard is to first dig the trench, then lay a bedding of concrete or other filler material, then set the conduits therein and then encase the conduits in a further mass of concrete or the like.

The conduits themselves are now usually made of concrete or cement construction of usual type wherein cement, sand and water are mixed together and the conduits formed in a mold or like construction. When thus made, the conduits are more or less rough on the inner surface, which roughness tends to frictionally retard the pulling of the electric cables therethrough. Divers methods have been resorted to to overcome this frictional resistance, as for instance reaming the interior of the conduits to a smooth surface or by putting some sort of a slip or lubricating material around the cables as they are being pulled through the conduits.

These methods so employed however are not entirely satisfactory and there is still a great deal of resistance offered to the cable as it is being pulled through the conduits so that under the present methods it is unusual that a conduit of any considerable length can be used, and hence there must be an open manhole put at frequent intervals in order to provide for the dragging of the cable.

It is the object of my invention to provide a conduit which will be so constructed as to be inherently smooth and "slick" so as to provide no practical resistance to the cable, and which smoothness and slickness will be present even though the drag of the cable through the conduit may tend to wear into the surface thereof. In other words I aim to produce a conduit which will have built into it and as an inherent element thereof a lubricating constituent.

Fig. 1 of the drawings accompanying this specification is a longitudinal sectional view of a section of the conduit and manhole construction illustrative of the subject matter of the invention, although in practice I do not wish to be considered as confining myself to any particular form or shape of the conduit or method or means by which it may be held or disposed in place within the underground ditch.

Fig. 2 is a vertical section of the conduit construction taken on a line 2—2 of Fig. 1.

In providing my improved conduit construction I preferably form the same in the following manner and of the following materials:—To two parts of finely comminuted soapstone I add one and one-half parts of finely comminuted clay and one part of cement. By weight this is usually forty pounds of soapstone and thirty-five pounds each of the clay and cement. These ingredients in the preferred proportions stated are mixed with water to a consistency in which the mass may be conveniently worked through a shaping die and the mass is then moved through the die to form the conduit of approved size, shape and length. They are usually made in three-foot sections 1 which are joined together as they are laid end to end in the concrete mass 2 within the ditch 3.

When these conduit lengths are made in the manner stated they are then allowed to set, harden and dry, after which they are ready for use in the manner stated.

The cement provides the necessary tensile strength while the clay provides a necessary binder and slip element to permit the conduits to be formed by forcing the mass through a shaping die. The soapstone serves a dual purpose in that it assists in permitting the mass to be easily forced through the shaping die and, at the same time, being intimately mixed through the mass, provides, when the conduits are dry and ready for use, a lubrication or slip means inherently formed as a constituent part of the conduit.

By having the core of the die of a smooth surface the interior of the conduit is initially formed with a very smooth slick surface, which smothness and slickness will continue to be presented to the cable 4 as it is drawn through the conduit even though the friction thereof tends to wear into the body of such conduit. As a matter of fact should there be a certain amount of frictional wear engendered between the cable and the conduit the fine powder ground up by reason of such wear will contain a large percentage of soapstone, which will increase the lubricating qualties desired.

In the event lightness is desired in the conduit instead of the ingredients in the proportions previously stated being used the initial mass might be made of two parts finely comminuted soapstone, one and one-half parts finely comminuted clay, one and one-fourth parts cement and one part of sawdust by volume, which would usually be forty pounds soapstone, thirty-five pounds clay, forty-three and one-half pounds cement and eight pounds of sawdust.

The conduit would be formed of the latter material in the same manner above described but the sawdust would add lightness thereto and also would tend to facilitate the slip of the cable through the conduit by forming slight protuberances which have been found in practice to break loose and have the effect of a roller bearing action against the cable as it is dragged through the conduit.

An ideal conduit for the purpose stated is one which has strength, water-proofing qualities, dielectric resistance and a smooth non-friction interior surface bearing. My conduit constructed in the manner stated furnishes all of these ideal qualities, namely:—The cement gives it strength and the soapstone water-proofs it, has dielectric resistance, and furnishes the smooth and inherent lubricating qualities stated. In addition to having these desirable qualities my improved conduit has the additional advantage that by reason of its initial mass constituency it may be formed in a shaping die which enables it to be made faster and cheaper than where it is formed through the laborious method of molding, as has been the prior practice.

Having thus described my invention what I claim as new and useful and desire to secure by Letters Patent is:

1. A conduit in which soapstone is incorporated into the walls thereof as a constituent part of such walls.

2. A conduit in which finely comminuted soapstone is the predominating constituent thereof.

3. A conduit comprising a cement, a filler material and a lubricating ingredient intimately mixed together.

4. A conduit consisting of soapstone, clay and cement intimately mixed together.

5. A conduit consisting of soapstone, clay, cement and sawdust intimately mixed together.

6. A conduit comprising clay and cement and a ground mineral lubricating ingredient all intimately mixed together.

7. A conduit comprising soapstone, clay and cement mixed together in the preferred proportions by weight of two parts of soapstone, one and one-half parts of clay and one part of cement intimately mixed together.

8. A conduit comprising by weight two parts of soapstone, one and one-half parts of clay, one and one-fourth parts of cement and one part of sawdust intimately mixed together.

In testimony whereof I affix my signature.

JOHN F. MAKOWSKI.